(12) United States Patent
Fernandez

(10) Patent No.: US 10,721,917 B2
(45) Date of Patent: Jul. 28, 2020

(54) PET WASTE DISPOSAL APPARATUS

(71) Applicant: Lawrence Fernandez, Madera, CA (US)

(72) Inventor: Lawrence Fernandez, Madera, CA (US)

(*) Notice: Subject to any disclaimer, the term of this patent is extended or adjusted under 35 U.S.C. 154(b) by 0 days.

(21) Appl. No.: 14/884,618

(22) Filed: Oct. 15, 2015

(65) Prior Publication Data
US 2016/0219836 A1    Aug. 4, 2016

Related U.S. Application Data

(60) Provisional application No. 62/125,687, filed on Jan. 29, 2015.

(51) Int. Cl.
*A01K 23/00*    (2006.01)
*A01K 1/01*    (2006.01)

(52) U.S. Cl.
CPC .............. *A01K 23/005* (2013.01); *A01K 1/01* (2013.01)

(58) Field of Classification Search
CPC ........ A01K 23/00; A01K 23/005; A01K 1/01; A01K 1/011; A01K 1/0107; A01K 1/0114; A01K 1/0121
USPC .................................................. 119/161, 165
See application file for complete search history.

(56) References Cited

U.S. PATENT DOCUMENTS

| | | | | |
|---|---|---|---|---|
| 3,520,003 A | * | 7/1970 | Shaw | B63B 29/00 4/317 |
| 3,688,742 A | * | 9/1972 | McGee | A01K 1/0121 119/162 |
| 3,734,057 A | * | 5/1973 | Lee | A01K 1/011 119/163 |
| 3,771,491 A | * | 11/1973 | Hunter | A01K 1/011 119/163 |
| 3,835,812 A | * | 9/1974 | Edwards | A01K 1/011 119/163 |
| 3,979,781 A | * | 9/1976 | Jolicoeur | E03D 11/025 4/341 |
| 4,052,756 A | * | 10/1977 | Whiteman, Sr. | E03D 11/02 4/345 |
| 4,075,718 A | * | 2/1978 | Hargraves | E03D 3/10 137/207 |
| 4,222,130 A | * | 9/1980 | Roberts | E03D 5/016 4/317 |
| 4,228,554 A | * | 10/1980 | Tumminaro | A01K 1/0121 119/161 |
| 4,262,634 A | * | 4/1981 | Piccone | A01K 1/0121 119/162 |
| 4,432,498 A | * | 2/1984 | Clements | A01C 3/02 119/165 |

(Continued)

*Primary Examiner* — Monica L Barlow
*Assistant Examiner* — Aaron M Rodziwicz
(74) *Attorney, Agent, or Firm* — Sherrie M Flynn; Coleman & Horowitt LLP

(57) ABSTRACT

A pet waste disposal apparatus comprising a funnel shaped receptacle with a top open end for receiving pet waste and a bottom open end connectable to a sewage line via one or more plumbing adapters for discharging the pet waste. The apparatus further comprises a lid closure removably attached to the top open end of the receptacle and a water inlet on the exterior receptacle to receive from a hose supplying water from a water source and discharge pressurized water into the receptacle for flushing the pet waste.

4 Claims, 2 Drawing Sheets

(56) References Cited

U.S. PATENT DOCUMENTS

| | | | | |
|---|---|---|---|---|
| 4,593,645 | A * | 6/1986 | Dingler | A01K 1/011 119/165 |
| 5,070,820 | A * | 12/1991 | Gorman | A01K 1/0107 119/161 |
| 5,996,533 | A * | 12/1999 | Gordon | A01K 1/0114 119/166 |
| 7,121,228 | B1 * | 10/2006 | Klauber | A01K 1/0107 119/161 |
| D615,256 | S * | 5/2010 | Emerson | D30/161 |
| 8,151,732 | B2 * | 4/2012 | Fournier | A01K 1/011 119/161 |
| 8,408,160 | B1 * | 4/2013 | Pozin | A01K 1/011 119/170 |
| 8,434,426 | B2 * | 5/2013 | Smith | A01K 1/011 119/163 |
| 8,640,273 | B1 * | 2/2014 | Condurso | A01K 1/01 4/449 |
| 9,510,558 | B2 * | 12/2016 | Tilmant | A01K 1/011 |
| 2007/0289541 | A1 * | 12/2007 | Giardina | A01K 1/011 119/165 |
| 2009/0205576 | A1 * | 8/2009 | Lema | A01K 1/011 119/161 |
| 2009/0241849 | A1 * | 10/2009 | Fournier | A01K 1/011 119/161 |
| 2010/0122662 | A1 * | 5/2010 | Kennington | A01K 1/0114 119/165 |
| 2011/0283949 | A1 * | 11/2011 | Kelly | A01K 1/011 119/161 |
| 2015/0075437 | A1 * | 3/2015 | Karr | A01K 1/0121 119/165 |

* cited by examiner

PET WASTE DISPOSAL APPARATUS

CROSS REFERENCE TO RELATED APPLICATIONS

This application claims the benefit of U.S. Provisional application No. 62/125,687 filed on 29 Jan. 2015.

FIELD OF THE INVENTION

The present invention generally relates to pet toilet systems and more specifically relates to a pet waste disposal apparatus that can be installed in a building and the pet waste disposal apparatus is connectable to a sewage system of the building through plumbing fittings.

BACKGROUND OF THE INVENTION

Raising household pet animals often requires commitment from pet owners for feeding, tending and cleaning after their pets. Also, nowadays the living environment also is not very supportive for raising pets, for instance, people living in high-rise apartments and in houses without lawn areas, find it difficult to tend to pets and in some cases the living arrangements can also be unsafe for raising pets. Defecation or excretion of waste by pets such as dogs, for example, either indoors or outdoors has become an ever increasing problem. Pet owners have consequently been faced with the continuing problem of disposal of their pet's waste.

Attempts have been made to develop toilet systems to assist pet owners in the disposal of pet waste. One such type of pet toilet system allow waste to accumulate in a removable tray, which is not only unsanitary, but also creates undesirable odor and difficult to clean. Whereas other types of pet toilet requires more space and complicated systems which are neither economical nor feasible for pet owners. Therefore, indoor pet toilet systems that conveniently dispose of pet waste are desirable.

Hence, there still exists an unresolved need for a simple and efficient pet waste disposal system connectable to a sewage system of the building for quick and hygienic way of disposal of the pet waste.

SUMMARY OF THE INVENTION

The present invention relates to a pet waste disposal apparatus comprising a funnel shaped receptacle, with a top open end for receiving pet waste and a bottom open end for discharging the pet waste, wherein the bottom second open end is connectable to a sewage line via one or more plumbing adapters. The pet waste disposal apparatus further comprise a lid closure removably attached to the top open end of the receptacle and a water inlet on the receptacle to receive from a water supply and discharge water into the inner walls of the receptacle for flushing the pet waste.

The pet waste disposal apparatus of the present invention is mountable to a fixed solid support such as a building wall, indoor or outdoor, using clamping or similar means of mounting. In an embodiment, the inner wall of the receptacle comprises one or more nozzles for receiving water from the inlet and discharging pressurized water into the receptacle for flushing down the pet waste through the existing sewage line. The plumbing adapter or fitting comprises connecting adapters, connecting pipes and clean out adapters.

DETAILED DESCRIPTION OF DIFFERENT EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
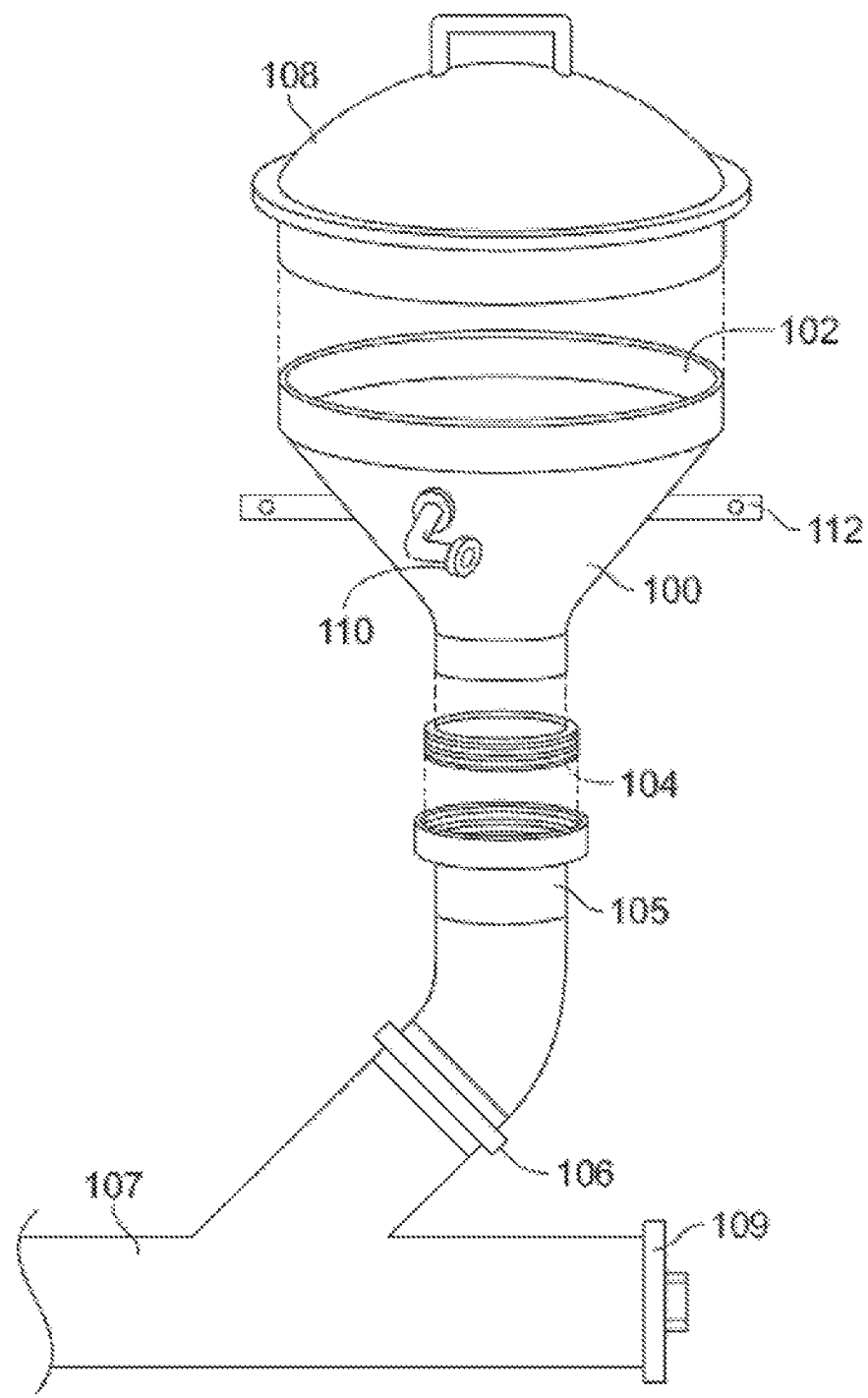
FIG. 1 illustrates a perspective view of the pet waste disposal apparatus.

Referring to FIG. 1, illustrating a pet waste disposal apparatus comprising a funnel shaped receptacle 100, with a top open end 102 for receiving pet waste and a bottom open end 104 for discharging the pet waste, wherein the bottom open end 104 is connectable to a sewage line 107 via one or more plumbing adapters 105, 106. The pet waste disposal apparatus further comprise a lid closure 108 removably attached to the top open end 102 of the receptacle 100. A water inlet 110 is disposed on the outer wall of the receptacle 100 to receive water from a water source and discharge water into the inner walls of the receptacle 100 for flushing the pet waste.

The plumbing adapter or plumbing fitting comprises connecting adapters 105, 106 and connecting pipes and clean out adapters 109. The connecting adapters 105, 106 facilitates connecting the bottom open end 104 of the receptacle 100 to an existing sewage line 107 of the building, for safely disposing the pet waste along the sewage. The sewage may undergo further treatment or merges with other sewer lines from neighboring buildings for safe disposal into a designated area.

Figure 2:
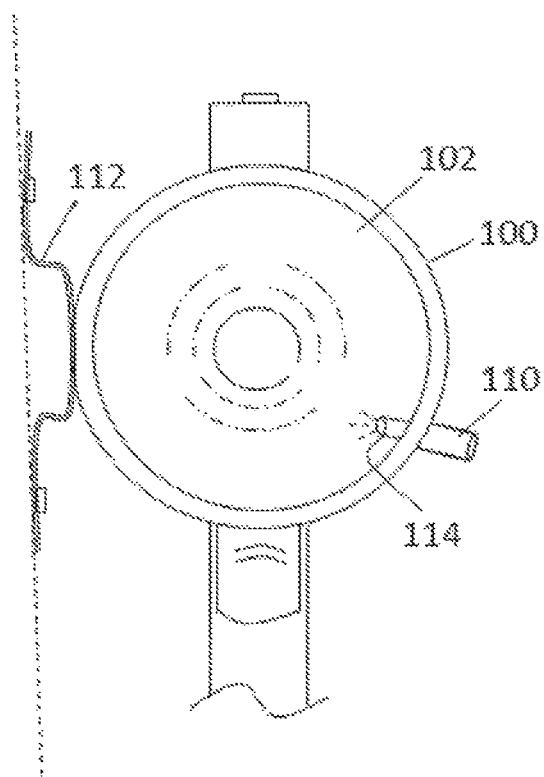
FIG. 2 illustrates a top view of the pet waste disposal apparatus in open position.

In an embodiment, the water inlet 110 is connectable to a hose supplying water from a water source. The water inlet 110 comprise a channel connecting to the inner wall of the receptacle. FIG. 2 illustrates a top view of the pet waste disposal apparatus showing top open end 102 of the receptacle 100 comprising a nozzle 114 disposed on the inner wall, configured to discharge pressurized water into the receptacle 100, which aids in disintegrating and flushing of the pet waste. The nozzle 114 receives water from the water source via the water inlet 110. The receptacle 100 is mountable to a fixed solid support such as wall of the building using clamping members 112.

In an exemplary embodiment, the receptacle 100 is designed to be 16 inches in height and top open end 102 is 9 inches wide. The lid closure 108 comprises an engaging portion within the receptacle, which is 2 inches in height. The receptacle 100 material is 3/8 inches in thickness and adapters comprises 3 inch to 4 inch connecting adapters. In an embodiment, the water inlet 110 can be connected to a water reservoir via piping or tubing connections, in order to receive water supply for flushing or cleaning the receptacle.

The pet waste disposal apparatus of the present invention can be mounted to a solid support such as a building wall present indoor or outdoor, if provided with an accessibility to an existing sewer line or drainage of the building.

It will be apparent to those skilled in the art that the foregoing description is for illustrative purposes only, and that various changes and modifications can be made to the present invention without departing from the overall spirit and scope of the present invention. The full extent of the present invention is defined and limited only by the following claims. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

I claim:

1. A pet waste disposal apparatus comprising:
   a funnel shaped receptacle, 16 inches in height having a top open end to receive pet waste and a bottom open end for discharging the pet waste, wherein the top open end is 9 inches in width and the bottom open end is connected to a sewage line via one or more plumbing adapters;
   a lid removably attached to the top open end of the receptacle, wherein the lid is entirely separated from the top open end during use;
   a water inlet on the receptacle, wherein the water inlet is attached to a water hose and facilitates a flow of water into the receptacle to flush the pet waste
   a clean out adapter removably attached to a clean out of the sewage line, wherein the receptacle is attached to the sewage line at an acute angle relative to the clean out adapter; and
   one or more clamping members attached to an exterior of the receptacle, wherein the one or more clamping members facilitate mounting of the receptacle to a support structure.

2. The pet waste disposal apparatus of claim 1, further comprising one or more nozzles on an inner wall of the receptacle, wherein the one or more nozzles deliver pressurized water within the receptacle.

3. The pet waste disposal apparatus of claim 1, wherein the one or more plumbing adapters comprise a pipe connecting adapter.

4. The pet waste disposal apparatus of claim 1, wherein the receptacle is mounted to a fixed solid support structure.

* * * * *